United States Patent [19]
Gold

[11] Patent Number: 6,033,170
[45] Date of Patent: Mar. 7, 2000

[54] SCREW HEAD NAIL

[76] Inventor: Peter Gold, 465 N. Wood Rd., Rockville Centre, N.Y. 11570

[21] Appl. No.: 08/368,099

[22] Filed: Jan. 3, 1995

[51] Int. Cl.⁷ ..................................................... F16B 15/02
[52] U.S. Cl. ............................ 411/480; 411/482; 411/397
[58] Field of Search ..................................... 411/480, 439, 411/396, 397, 482, 485, 178, 440, 441

[56] References Cited

U.S. PATENT DOCUMENTS

| | | | |
|---|---|---|---|
| 309,817 | 12/1884 | Bartow | 411/397 |
| 722,046 | 3/1903 | Rieger | 411/397 |
| 824,983 | 7/1906 | Farrington | 411/397 |
| 1,907,495 | 5/1933 | Brunski | 411/397 |

FOREIGN PATENT DOCUMENTS 464208  4/1937  United Kingdom ................... 411/397

*Primary Examiner*—Teri Pham
*Attorney, Agent, or Firm*—Galgano & Burke

[57] ABSTRACT

An improved screw head nail includes a cylindrical machine screw and a nail having an upper end defining a nail head, a lower end defining a nail point, and a nail shank disposed therebetween. The nail shank has a centrally disposed threaded cylindrical bore extending from the nail head towards the nail point. The nail head has a generally frustoconical opening formed therethrough which is aligned with and opens onto the cylindrical bore and which, upon flattening of the nail head, protects the cylindrical bore from substantial damage and exposes the same for allowing full threaded receipt of the machine screw therein.

1 Claim, 1 Drawing Sheet

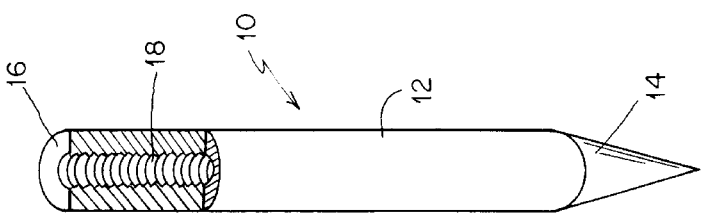

SCREW HEAD NAIL

BACKGROUND OF THE INVENTION

The present invention relates to an improved screw head nail. More particularly, it relates to a screw head nail having a cylindrical bore which is designed to receive a cylindrical machine screw and which is provided with a uniquely configured nail head to prevent obstruction of the cylindrical bore upon hammering of the nail into a workpiece.

Screw head nails have been used for many years for a variety of purposes. For example, in U.S. Pat. No. 309,817, an ornamental screw head is disclosed which includes a headless nail which, after the nail is hammered into a workpiece, is covered by an ornamental screw head having a threaded tapered shaft which is received within the tapered threaded bore of the nail (a somewhat similar fastening device for screws is disclosed in U.S. Pat. No. 722,046).

In addition, screws are known (see U.S. Pat. No. 824,983), the screw head of which have a central cylindrical bore for the threaded receipt of a cylindrical machine screw. However, so far as is known, no presently available screw head nail is able to accommodate a cylindrical machine screw in an effective and working manner.

As shown in the hypothetical comparison examples of FIGS. 1 and 2 drawings, if a nail 10 composed of a nail shank 12 having a point at one end 14 and a nail head 16 at its other end is provided with a threaded cylindrical bore 18 and is hammered via hammer 19 into a workpiece 11, the hammered end 16 becomes deformed, as a result of which the threaded cylindrical bore 18 formed therein would become clogged and deformed, rendering it unusable for the intended purpose of inserting a machine screw therein. This is not a problem with screws having a cylindrical machine screw threadably received in the screw head, because the screw head is not hammered, and as a result, the cylindrical bore opening is not deformed or clogged.

Indeed, no one has discovered or addressed the problem of enabling a nail to have a cylindrical machine screw received in its nail head, which nail head must often be hammered and flattened during installation. In both of the known cases discussed above, the use of a tapered screw bore and the use of a tapered screw would still allow the screw to be inserted into the screw hole without too much problem, since the narrow tip of the tapered screw could still be threaded into the flared opening of the screw past any deformation. However, the same is not true with the use of a cylindrical machine screw.

SUMMARY OF THE INVENTION

Accordingly, it is an object of the present invention to provide a new and improved screw head nail which overcomes the problems associated with the prior art and which, upon hammering and flattening of the nail head, protects its cylindrical bore from substantial damage and exposes the same for allowing threaded receipt of machine screws therein.

It is also an object of the present invention to provide such a novel screw head nail which is of relatively simple and easy construction, facile to use, and which is reliable in operation.

Certain of the foregoing and related objects are readily attained in an improved screw head nail which includes a cylindrical machine screw and a nail having an upper end defining a nail head, a lower end defining a nail point, and a nail shank disposed therebetween. The nail shank has a centrally disposed threaded cylindrical bore extending from the nail head towards the nail point. The nail head has a generally frustoconical opening formed therethrough which is aligned with and opens onto said cylindrical bore and which, upon flattening of the nail head, protects the cylindrical bore from substantial damage and exposes the same for allowing full threaded receipt of the machine screw therein.

BRIEF DESCRIPTION OF THE DRAWINGS

These and other objects and advantages of the present invention will become apparent from the following description of the accompanying drawing which discloses one embodiment of the present invention. It is to be understood that the drawing is to be used for the purpose of illustration only and not as a definition of the invention.

In the drawing, wherein similar reference numerals denote similar elements throughout the several views:

FIG. 1 is a perspective view, in part section, of a hypothetical comparison example of a headless screw head-type nail;

FIG. 2 is a schematic representation showing the headless nail of FIG. 1 being hammered into a substrate;

FIG. 3 is an exploded, cross-sectional view, in part elevation, of the screw head nail embodying the present invention;

FIG. 4 is a schematic view, in part section, showing the screw head nail of the present invention being hammered into a substrate; and FIG 5 is a schematic view, in part section, showing the screw head nail after it has been hammered into the substrate and further showing the receipt of a cylindrical machine head screw in the screw head nail of the present invention and, in phantom view, the machine screw prior to insertion.

DETAILED DESCRIPTION OF THE PREFERRED EMBODIMENT

Turning now in detail to the drawings, and in particular FIGS. 1 and 2, therein illustrated is a hypothetical headless screw head-type nail which illustrates the problem if such a nail were to be used with a cylindrical machine-type screw. As shown in FIG. 1, the cylindrical nail 10 is composed of a shank 12 having a point 14 at one end and a flat, headless end 16 at its opposite end. A cylindrical bore 18 is formed in the headless end 16 of the nail shank 12 and extends towards the nail point 14. The cylindrical threaded bore 18 serves to receive a machine screw 40 of the type having a threaded cylindrical shank 42 and a slotted head 44 of the conventional and known machine screw type (see FIG. 3). As represented in FIG. 2, if one were to hammer such a nail 10 into a substrate or workpiece, the headless end 16 of the nail 10 would be deformed by the hammer 19 causing obstruction of the threaded cylindrical bore 18 thereof, thereby preventing the threadable insertion of a machine screw 40 therein.

As shown in FIGS. 3–5, the present invention serves to overcome this problem by providing a screw head nail 20 having an upper end defining an enlarged nail head 26, a lower end defining a nail point 24, and a nail shank 22 disposed therebetween. The nail shank 22 has a centrally disposed threaded cylindrical bore 28 extending from the nail head 26 towards the nail point 24. The nail head 26 has a generally frustoconical sidewall 30 defining an outwardly flared opening formed therethrough which is aligned with the opening into the cylindrical bore 28.

As seen best in FIG. 4, when the nail 20 of the present invention is hammered into a substrate 11, the nail head 26 deforms radially outwardly in a controlled manner such that the frustoconical sidewall 30 becomes flattened out without blocking the center bore 28. The cylindrical bore 28 is thus protected from substantial damage and is left exposed for allowing threaded receipt of a machine screw 40 therein of the type having a threaded cylindrical shank 42 and a slotted head 44, as represented in FIG. 5.

Accordingly, while only one embodiment of the present invention has been shown and described, it is to be understood that many changes and modifications may be made thereunto without departing from the spirit and scope of the invention as disclosed herein.

What is claimed is:

1. An improved screw head nail comprising:

a nail having an upper end defining a nail head, a lower end defining a nail point, and a nail shank disposed therebetween, said nail shank having a centrally disposed internally threaded cylindrical bore extending from said nail head towards said nail point, said nail head having a generally frustoconical opening formed therethrough which is aligned with and opens onto said cylindrical bore and which, upon flattening of said nail head, protects the cylindrical bore from substantial damage and exposes said cylindrical bore for allowing full threaded receipt of a cylindrical machine screw therein, wherein said nail head is generally cylindrical and has an enlarged diameter relative to said nail shank and said frustoconical opening is recessed within said nail head and centrally aligned with said cylindrical bore; and a cylindrical machine screw threadably receivable in said internally threaded cylindrical bore.

* * * * *